United States Patent

[11] 3,607,664

[72] Inventors: Jean Mascarello, Versailles; Roger Personnic, Chaville, both of France
[21] Appl. No. 783,539
[22] Filed Dec. 13, 1968
[45] Patented Sept. 21, 1971
[73] Assignee Electricite de France (Service National) Paris, France
[32] Priority Dec. 15, 1967
[33] France
[31] 132,537

[54] SINGLE-STAGE FLASH DISTILLATION APPARATUS IN A STEAM CONDENSATION PLANT
1 Claim, 4 Drawing Figs.

[52] U.S. Cl. .................................................. 202/180, 202/197, 202/205, 60/89, 203/11, 203/88, 203/DIG. 20
[51] Int. Cl. .................................................. B01d 3/00
[50] Field of Search .......................................... 202/180, 205, 173, 197; 203/DIG. 20, 11, 88, 100; 60/89, 67

[56] References Cited
UNITED STATES PATENTS

| | | | |
|---|---|---|---|
| 3,364,125 | 1/1968 | Switzer | 202/160 |
| 3,391,062 | 7/1968 | Tidball | 203/11 |
| 3,412,558 | 11/1968 | Starmer | 203/173 |
| 3,418,214 | 12/1968 | Cane | 202/197 |
| 3,451,220 | 6/1969 | Buscemi | 60/73 |
| 3,467,587 | 9/1969 | Connell et al. | 202/173 |
| 3,476,653 | 11/1969 | Doland | 202/173 |
| 3,461,039 | 8/1969 | Starmer | 202/197 |

Primary Examiner—Wilbur L. Bascomb, Jr.
Attorney—Young and Thompson

ABSTRACT: A steam condensation plant comprising a plurality of condensers incorporates a flash distillation apparatus which includes an instantaneous vaporization and condensation chamber associated with at least one of the condensers. Impure feed water for the apparatus comprises cooling water from the plant and is derived from downstream of said one of the condensers.

INVENTORS
JEAN MASCARELLO
ROGER PERSONNIC
BY Young + Thompson
ATTYS.

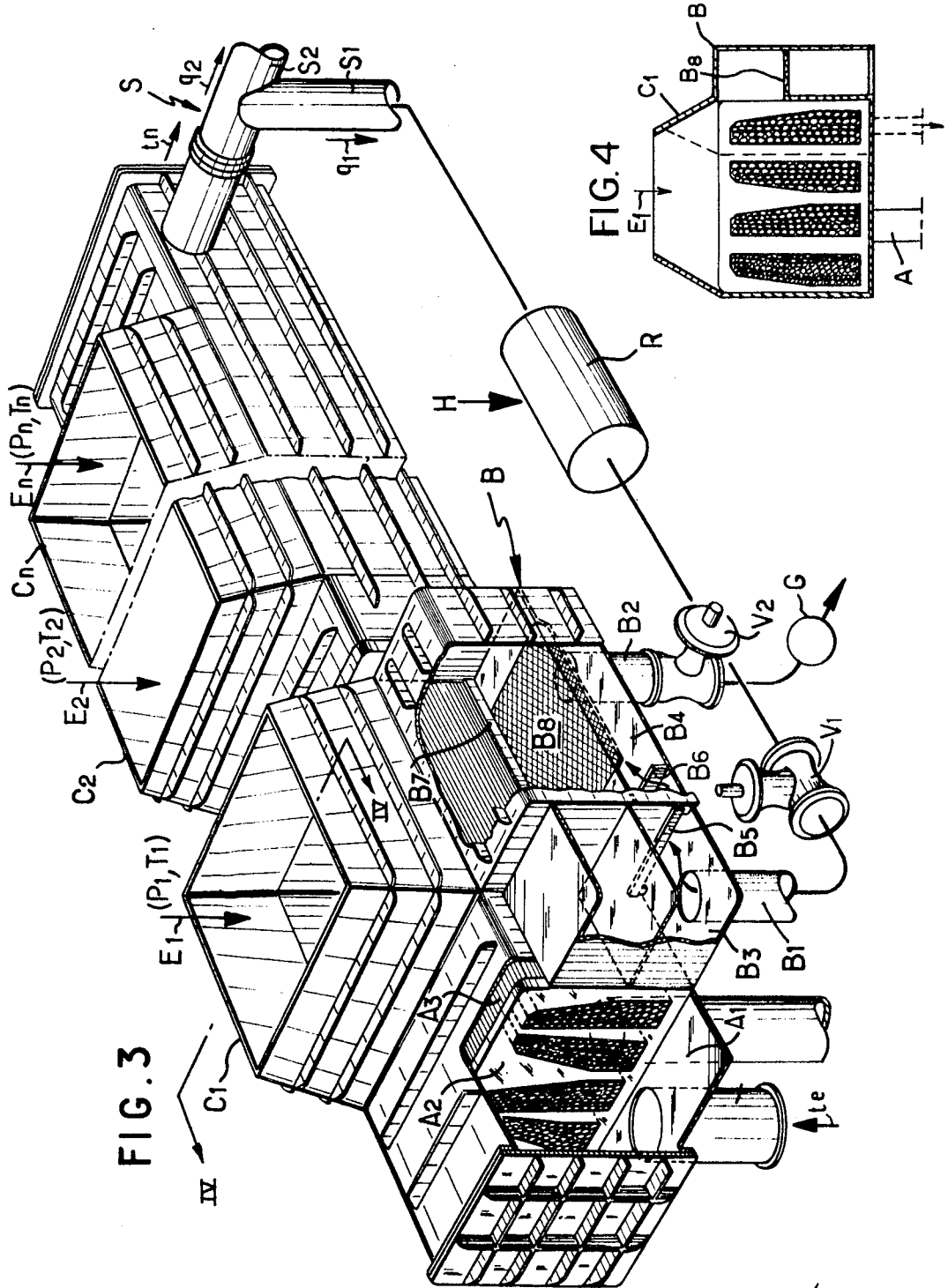

SINGLE-STAGE FLASH DISTILLATION APPARATUS IN A STEAM CONDENSATION PLANT

BACKGROUND OF THE INVENTION

This invention relates to flash distillation apparatus.

Various processes are used to produce pure water from hard, brackish, salt or otherwise impure water, and particularly the process of instantaneous distillation under vacuum, the so-called "flash distillation" process. In this process, water to be purified is introduced into a chamber in which the pressure is lower than the saturated steam pressure corresponding to the intake temperature of the water; the water to be purified therefore partially vaporizes and the resulting steam is condensed in a suitable part of the chamber and thus constitutes a source of pure water. It is understood that the term "pure water" includes any water having characteristics corresponding to those required either for industrial use, or domestic use, or for use in irrigation.

Steam power generating stations and many other industrial plants are normally provided for their own use with condensers comprising heat exchangers in which steam is condensed. In particular, condensation plants are known in which each of a plurality of condensers is used for a different machine, although all the condensers are cooled by the same fluid which circulates through the condensers in series. Likewise, a condensation plant which is associated with a single multipart machine can comprise a plurality of individual condensers, each of which is intended to receive steam from a different part of the machine, a cooling fluid passing through all the individual condensers in series.

One object of the present invention is to use the condensers of plants of this type for the production of pure water from their impure cooling water.

SUMMARY OF THE INVENTION

According to the present invention there is provided in a steam condensation plant comprising a plurality of condensers having cooling water passing through them in series, an apparatus for the production of pure water by a flash distillation process, the apparatus comprising an instantaneous vaporization and condensation chamber in association with one of said condensers, and means to supply impure water to said chamber for vaporization, at least part of said impure water comprising said cooling water drawn off from a point downstream with respect to said condenser.

Obviously distillation of a part of the impure water is only possible if the temperature of the water is higher than that prevailing in the condensation chamber; such an arrangement will therefore not work for a single condenser. On the other hand, in the proposed apparatus by profiting from the heating effect to which the water of the cooling circuit is progressively subjected in its normal function of cooling, there is formed a positive temperature difference between the impure water which is introduced into a condensation chamber and the condensation chamber itself, thus permitting the production of pure water.

BRIEF DESCRIPTION OF THE DRAWINGS

A flash distillation apparatus in accordance with the present invention will now be described by way of example with reference to the accompanying diagrammatic drawings, in which:

FIG. 3 shows an application of the invention to plants of this type, and FIG. 4 is a section on the line IV—IV of FIG. 3, showing the separate removal of the pure water in an alternative embodiment.

DESCRIPTION OF THE PREFERRED EMBODIMENT

Figure 1:
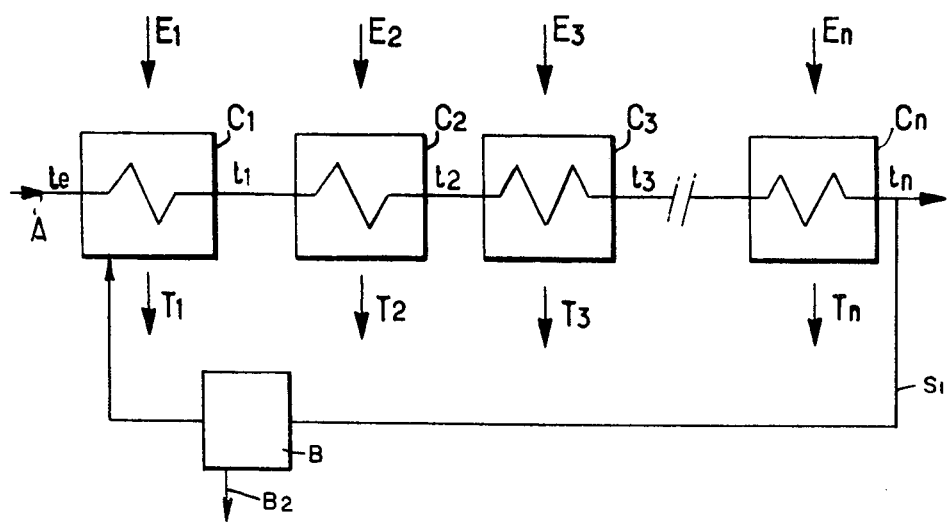
FIG. 1 shows a condensation plant for a plurality of machines and using the same cooling water.
Figure 2:
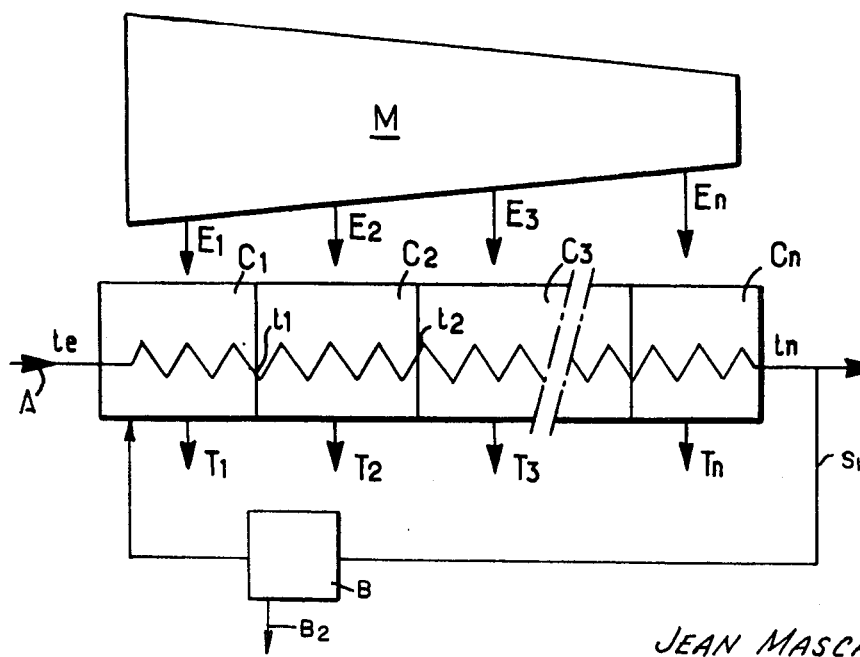
FIG. 2 shows a condensation plant having a plurality of individual condensers, which also have the same cooling water passing through them in series.

Referring to FIGS. 1 and 2, steam from outlets $E1, E2, E3 ... En$ which are from a plurality of machines (FIG. 1) or which are separate outlets of the same machine M (FIG. 2) condenses respectively in condensers $C1, C2, C3 ... Cn$ at temperatures $T1, T2, T3 ... Tn$, the condensers being cooled by water circulating through them in series along a path A. The temperature of the water increases from the temperature $te$ at the intake of the first condenser to the temperature $tn$ at the outlet of the last condenser, the temperatures at the outlet of the successive condensers $C1, C2, C3 ... Cn$ being $t1, t2, t3 ... tn$, respectively.

In the embodiment illustrated in FIG. 3, a condenser plant comprises a successive series of condensers $C1, C2, ... Cn$ which receive the outlet steam $E1, E2 ... En$ at progressively increasing pressures $P1, P2 ... Pn$ and at corresponding temperatures $T1, T2 ... Tn$ of a machine or a group of machines with multiple outlets. The impure cooling water passes into the condenser C1 through an intake pipe A at a temperature $the$ and issues from the condenser Cn at S at a temperature $tn$, which latter temperature $tn$ may be higher than the temperature T1 of the steam E1 of the condenser C1.

The inlet pipe A issues in the interior of the condenser C1 in an inlet chamber A1 which is limited in conventional manner by a tube plate A2 from which extends a nest or a group of nests of condensation tubes A3 through which passes the cooling water. The other condensers can be of similar construction.

The invention is applied to a plant of this type in the following manner.

Associated with the condenser C1 is an instantaneous vaporization or "flash" chamber B. This chamber B which is provided with an inlet pipe B1 and an outlet pipe B2 comprises an internal partition defining an inlet compartment B3 and an outlet compartment B4 with a series of baffles between them such as a descending partition B5 and an ascending partition B6. The outlet compartment B4 is in communication with the internal space of the condenser C1 above a partition B7. A drop separator B8 which comprises for example a metal grid, desirably extends over the entire horizontal section of the compartment B4 at a level slightly below the partition B7.

A two-way junction S with two outlet pipes S1, S2 is arranged at the outlet of the condenser Cn. The outlet pipe S1 is connected to the inlet B1 of the vaporization chamber B through the intermediary of a valve V1 and, if necessary, through the intermediary of an additional heater indicated diagrammatically at R. The arrow H represents a flow of heat energy from any source whatever to the heater R.

The outlet pipe B2 of the chamber B is in turn connected through the intermediary of a regulating valve V2 to a return pump which includes a pump G.

The outlet pipe S1 is adapted to draw off a certain fraction $q1$ of the cooling water which is at a temperature $tn$, while the remainder ($q2$) of the hot cooling water is exhausted in conventional manner via outlet pipe S2.

The hot impure water which is thus drawn off through outlet pipe S1 with a flow $q1$ at the temperature tn thus passes to the inlet B1 of the vaporization chamber B with the same flow $q1$ and at a certain temperature T' which may be higher than $tn$ if the optional additional heater R is in use.

In any case the temperature T' is higher than the temperature T1 prevailing in the condenser C1 and, taking into account the difference $\Delta T = T' - T1$ a certain part, say $q$, of the flow $q1$ undergoes instantaneous vaporization in the chamber B and more particularly in the compartment B4 thereof. The amount $q$ of the steam which is thus liberated increases as $\Delta T$ increases and as the flow $q1$ itself increases. This steam passes through the drop separator B8 which removes from it the drops of water which it is liable to entrain and goes on to be condensed on the nests of tubes A3 through which passes the cold cooling water. This results in the production of a flow $l$ of pure water which is mixed, in the embodiment illustrated, with the condensate from the outlet steam E1. The total flow of condensate is extracted by means of a conventional extractor pump (not shown).

The residual flow $q3=q1-q$ of impure water with its concentrated content of impurities discharges from the chamber B through the outlet B2; it is drawn by the pump G through the intermediary of the valve V2 and is delivered to a discharge pipe or possibly for reuse, for example on the same principle as above if the necessary temperature differences are favorable with regard to other condensers which may be provided.

The steam which has condensed on the tubes A3 of the condenser C1 provides a supplementary production of pure water with a flow $q$, which is of extremely good quality, due in particular to the provision of the drop separator B8. The flow rate of this supplementary amount of pure water can be advantageously increased, particularly when working at a low level of heat, by using the heater R which may be supplied with heat energy H from any suitable source.

An an alternative the pure water produced in the chamber B can be condensed separately, as shown in FIG. 4, that is without being mixed with the outlet steam E1 which is normally directed to the associated condenser C1; for example a part of the tubes A3 can be reversed for this purpose or a particular nest of tubes independent of A3 can be provided in the interior of the chamber B to condense the flow of steam from the chamber B. In this case recovery of the flow $q$ can be independent and the drop separator B8 can be dispensed with if a slightly less pure water is acceptable.

In the event that the tubes A3 are just sufficient to condense the outlet steam E1 for example when the associated machine is running at full power, the supplementary plant according to the invention can be isolated by closing the valves V1 and V2. In this case, the chamber B remains inoperative with respect to operation of the condenser C1.

The invention is not limited to the specific embodiment shown and described, and it will be obvious to those of ordinary skill in the art that various modifications can be made without departing from the invention as set out in the claims which follow.

We claim:

1. A steam condensation plant comprising a plurality of condensers, means for circulating a flow of impure water serially through said condensers from the first of said condensers to the last of said condensers, each of the condensers having an inlet for introducing a flow of steam therein for heating the impure water and for condensing the flow of steam and an outlet for condensate; a single-stage flash vaporization device, means for carrying a portion only of the flow of heated impure water from said last condenser to the flash vaporization device, the flash vaporization device being arranged in direct communication with the means for circulating the impure water of said first condenser so that the vapor formed by the flash vaporization device is also condensed on said means for circulating the impure water of said first condenser.